March 1, 1927.  1,619,367
F. E. PETERSON
ADJUSTABLE BRIDGE
Filed June 11, 1924
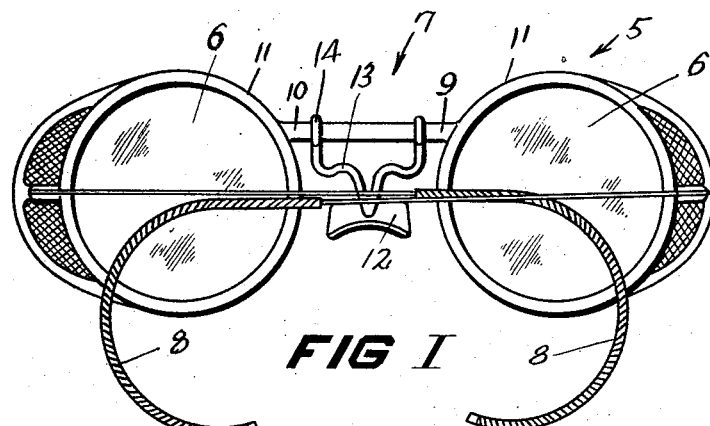
FIG I
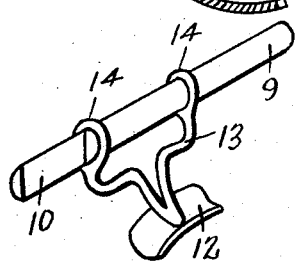
FIG II
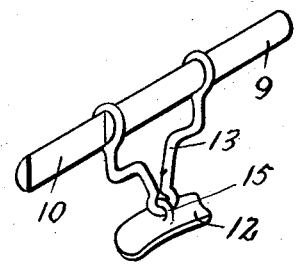
FIG III
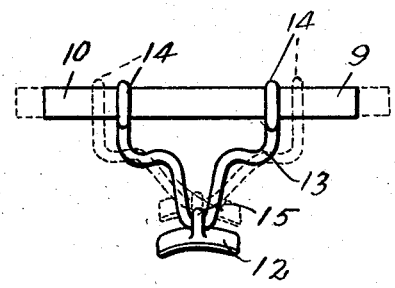
FIG IV
INVENTOR
FRANK E. PETERSON.
BY
Harry H. Styll
ATTORNEY Patented Mar. 1, 1927.

1,619,367

UNITED STATES PATENT OFFICE.

FRANK E. PETERSON, OF CHICAGO, ILLINOIS, ASSIGNOR TO AMERICAN OPTICAL COMPANY, OF SOUTHBRIDGE, MASSACHUSETTS, A VOLUNTARY ASSOCIATION OF MASSACHUSETTS.

ADJUSTABLE BRIDGE.

Application filed June 11, 1924. Serial No. 719,307.

The present invention relates to a bridge construction, and has particular reference to an adjustable bridge.

An important object of this invention is to provide a bridge that may be adjusted so as to give the necessary pupillary distance to a pair of lenses, either in goggles, spectacles or eyeglasses.

Another very important object of the invention is to provide a bridge especially well adapted for eye protectors, wherein the lenses associated with the bridge may be moved toward or away from each other as desired, the said adjustable bridge being adjusted by merely pushing the ends thereof toward or away from each other.

Another very important object of the invention is to provide an adjustable bridge that will facilitate the use of eye protectors, or the like, by more than one person.

Other objects and advantages of the invention will become apparent during the course of the following description.

In the drawings, wherein like numerals are employed to designate like parts throughout the same:

Figure I is an elevation illustrating the adjustable bridge in use upon an eye protector;

Figure II is a perspective view of one form of bridge;

Figure III is a similar view of a slightly modified form of bridge; and

Figure IV is an elevation of the bridge showing one adjustment in full lines, and a second adjustment in dotted lines.

In the drawings, wherein for the purposes of illustration is shown the preferred embodiment of the invention, the numeral 5 designates an eye protector in its entirety and comprises a pair of lenses 6, a bridge connection in its entirety 7, and temples 8.

In the case of spectacle and eyeglass mountings measurements are made to determine the size bridge required to fill the prescription of the patient being measured, and thus it is possible to get the necessary pupillary distance without any trouble. In the case of eye protectors such measurements are not made except in those cases where the lenses are required to be prescription lenses. In other words, the bridges in the majority of cases are all of the same nature, with the result that oftentimes persons use goggles which are not properly adjusted to their faces.

The prime object of this invention is to provide a bridge that may be quickly and readily adjusted so that the required pupillary distance may be had with very little trouble, so that different persons may use the goggles without any trouble.

The bridge comprises a pair of preferably semi-cylindrical portions 9 and 10. One end of the semi-cylindrical portions 9 and 10 is connected to the lens rims 11 and may be suitably braced to prevent displacement of the said rims with respect to the semi-cylindrical portions 9 and 10. The nose rest 12 is carried by a flexible preferably metallic wire depending member 13, which is associated with the members 9 and 10 by means of the rings 14. One of the rings 14 is rigidly connected with one end of the semi-cylindrical member 9, while the opposite ring is connected to the end of the semi-cylindrical member 10. In this manner it will be seen that the ring 14 connected to the end of the semi-cylindrical portion 9 will permit of longitudinal movement of the other semi-cylindrical member 10 and vice versa. In this way the members 9 and 10 may be moved together or away from each other, with the result that the said members will slide within the rings 14, thus moving the bridge portions in a position as indicated in dotted lines in Figure IV. The nose rest 12 may either be connected to the flexible connection 13 by means of solder or by means of the loop 15 so that the nose rest 12 may be rocked to adjust itself to the particular nose of the user.

By having the preferably semi-cylindrical portions 9 and 10 connected to the flexible member 13 as described, it will be seen that the relationship of the lenses 6 may be changed as desired or required by merely pushing them together or pulling them apart. Obviously it is not absolutely necessary to have the semi-cylindrical portions 9 and 10, but by having them so constructed it will be easier to shift them through the ring portions.

It is to be understood that the form of the invention herewith shown and described is to be taken as the preferred embodiment of the same, and that various changes in the size, shape and arrangement of parts may be resorted to without departing from the spirit of the invention or the scope of the subjoined claims.

Having thus described my invention, I claim:

1. An adjustable bridge for an ophthalmic mounting comprising a pair of overlying bridge members one slidable on the other, each bridge member being secured at one end to a lens rim member, and a bendable member having openings adjacent each end, a bridge member being secured in each opening leaving sufficient space for the other bridge member to slide freely in the opening whereby the bridge members may be slid one on the other by opening out or closing the bendable member and whereby the portion of the bendable member around the opening not secured to a bridge member acts as a guide to retain the bridge members in their related positions.

2. An adjustable bridge for an ophthalmic mounting comprising a pair of overlying bridge members one slidable on the other, each bridge member being secured at one end to a lens rim member and a bendable member having openings adjacent each end, a bridge member being secured in each opening leaving sufficient space for the other bridge member to slide freely in the opening whereby the bridge members may be slid one on the other by opening out or closing the bendable member and whereby the portion of the bendable member around the opening not secured to a bridge member acts as a guide to retain the bridge members in their related positions, and a nose engaging member secured to the bendable member.

FRANK E. PETERSON.